(12) United States Patent
Paul et al.

(10) Patent No.: US 10,489,979 B2
(45) Date of Patent: Nov. 26, 2019

(54) SYSTEMS AND METHODS FOR PROVIDING NESTED CONTENT ITEMS ASSOCIATED WITH VIRTUAL CONTENT ITEMS

(71) Applicant: Facebook, Inc., Menlo Park, CA (US)

(72) Inventors: Debashish Paul, Sunnyvale, CA (US); Charles Matthew Sutton, San Francisco, CA (US)

(73) Assignee: Facebook, Inc., Menlo Park, CA (US)

( * ) Notice: Subject to any disclaimer, the term of this patent is extended or adjusted under 35 U.S.C. 154(b) by 0 days.

(21) Appl. No.: 15/396,316

(22) Filed: Dec. 30, 2016

(65) Prior Publication Data
US 2018/0190025 A1 Jul. 5, 2018

(51) Int. Cl.
*G06T 19/00* (2011.01)
*G06F 3/0481* (2013.01)

(52) U.S. Cl.
CPC ........ *G06T 19/006* (2013.01); *G06F 3/04815* (2013.01)

(58) Field of Classification Search
CPC .............. G06T 19/006; G06T 15/205; G06T 2207/10028; G06F 3/04815
See application file for complete search history.

(56) References Cited

U.S. PATENT DOCUMENTS

| 6,097,393 | A | * | 8/2000 | Prouty, IV | .......... G06F 3/04815 345/419 |
|---|---|---|---|---|---|
| 2007/0164989 | A1 | | 7/2007 | Rochford | |
| 2009/0327969 | A1 | | 12/2009 | Estrada | |
| 2012/0254791 | A1 | | 10/2012 | Jackson | |
| 2013/0113826 | A1 | * | 5/2013 | Miyazaki | ................ G06F 3/011 345/632 |
| 2013/0335405 | A1 | * | 12/2013 | Scavezze | ................ G06T 19/20 345/419 |
| 2017/0372499 | A1 | * | 12/2017 | Lalonde | ............... G02B 27/017 |
| 2018/0160160 | A1 | * | 6/2018 | Swaminathan | .... H04N 21/2662 |

FOREIGN PATENT DOCUMENTS

WO 2015192117 12/2015

OTHER PUBLICATIONS

International Application No. PCT/US2017/012067, International Search Report and Written Opinion dated Sep. 25, 2017.

* cited by examiner

*Primary Examiner* — Tapas Mazumder
(74) *Attorney, Agent, or Firm* — Sheppard Mullin Richter & Hampton LLP

(57) ABSTRACT

Systems, methods, and non-transitory computer readable media can provide a virtual content item relating to a virtual three-dimensional space. An object within the virtual content item can be determined. One or more content items to provide within the virtual content item in association with the object can be determined. A three-dimensional position of the one or more content items within the virtual three-dimensional space of the virtual content item can be determined.

20 Claims, 11 Drawing Sheets

SYSTEMS AND METHODS FOR PROVIDING NESTED CONTENT ITEMS ASSOCIATED WITH VIRTUAL CONTENT ITEMS

FIELD OF THE INVENTION

The present technology relates to content presentation. More particularly, the present technology relates to techniques for providing content items in connection with objects within virtual content items.

BACKGROUND

Today, people often utilize computing devices (or systems) for a wide variety of purposes. Users can operate their computing devices to, for example, interact with one another, create content, share content, and access information. Under conventional approaches, content items (e.g., images, videos, audio files, etc.) can be made available through a content sharing platform. Users can operate their computing devices to access the content items through the platform. Typically, the content items can be provided, or uploaded, by various entities including, for example, content publishers and also users of the content sharing platform. The content items can be accessed in various environments, such as two dimensional or three dimensional environments.

SUMMARY

Various embodiments of the present disclosure can include systems, methods, and non-transitory computer readable media configured to provide a virtual content item relating to a virtual three-dimensional space. An object within the virtual content item can be determined. One or more content items to provide within the virtual content item in association with the object can be determined. A three-dimensional position of the one or more content items within the virtual three-dimensional space of the virtual content item can be determined.

In some embodiments, the one or more content items can be provided at the determined three-dimensional position.

In certain embodiments, the three-dimensional position includes a horizontal coordinate, a vertical coordinate, and a depth coordinate.

In an embodiment, the three-dimensional position of the one or more content items is determined in relation to a three-dimensional position of a point of view within the virtual content item.

In some embodiments, the virtual content item is one or more of: a spherical video, a 360 photo, a virtual reality (VR) content item, or an augmented reality (AR) content item.

In certain embodiments, the one or more content items are presented as one or more of: a two-dimensional content item, a three-dimensional content item, or a virtual content item.

In an embodiment, the object is one or more of: a logo or a brand, and wherein the one or more content items include one or more of: an advertisement, information relating to a product, or a representation of a product.

In some embodiments, the object is detected based on one or more of: object detection or object tracking.

In certain embodiments, the object is predefined within the virtual content item based on user input.

In an embodiment, the virtual content item is presented in a user interface and the one or more content items include a second virtual content item, and the second virtual content item is presented in the user interface in response to selection of the object or an indicator associated with the object.

It should be appreciated that many other features, applications, embodiments, and/or variations of the disclosed technology will be apparent from the accompanying drawings and from the following detailed description. Additional and/or alternative implementations of the structures, systems, non-transitory computer readable media, and methods described herein can be employed without departing from the principles of the disclosed technology.

Figure 1:
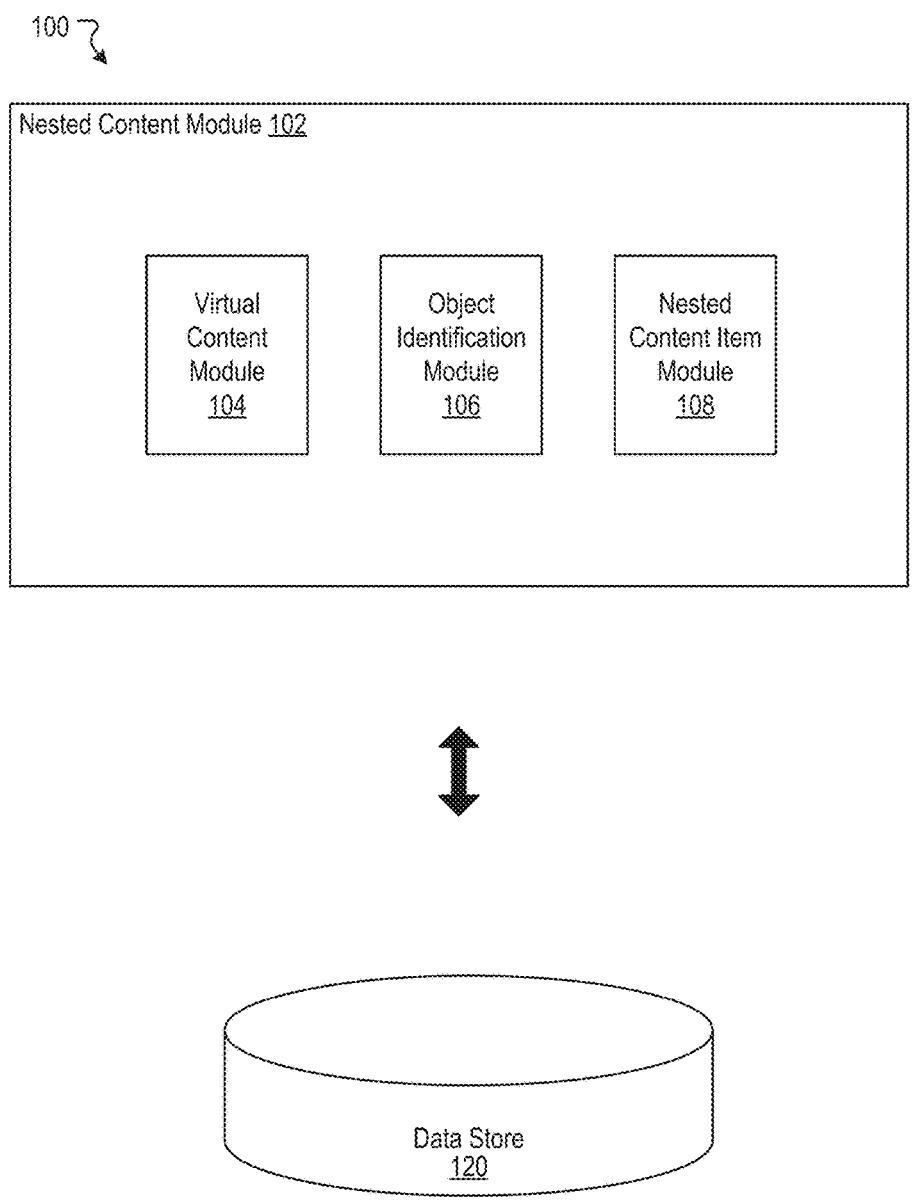
FIG. 1 illustrates an example system including an example nested content module configured to provide related content items associated with objects included in virtual content items, according to an embodiment of the present disclosure.

The figures depict various embodiments of the disclosed technology for purposes of illustration only, wherein the figures use like reference numerals to identify like elements. One skilled in the art will readily recognize from the following discussion that alternative embodiments of the structures and methods illustrated in the figures can be employed without departing from the principles of the disclosed technology described herein.

DETAILED DESCRIPTION

Providing Nested Content Items Associated with Virtual Content Items

People use computing devices (or systems) for a wide variety of purposes. As mentioned, under conventional approaches, a user can utilize a computing device to share content items (e.g., documents, images, videos, audio, etc.) with other users. Under conventional approaches, content items (e.g., images, videos, audio files, etc.) can be made available through a content sharing platform. Users can operate their computing devices to access the content items through the platform. Typically, the content items can be provided, or uploaded, by various entities including, for example, content publishers and also users of the content sharing platform. An example of the content sharing platform can include a social networking system.

In some instances, a user can access virtual content, for example, through a display screen of their computing device, a virtual reality system, or a head mounted display, to name a few examples. The virtual content may be composed using one or more videos and/or images that capture or present various scenes. Such scenes may be from the real world and/or be computer generated. In some instances, the virtual content is composed so that the user is able to navigate within the scenes presented by the virtual content. Thus, by accessing the virtual content, the user is able to experience and navigate the presented scenes virtually, for example, as if the user were physically present in the scenes. Examples of virtual content can include spherical videos, 360 photos, augmented reality (AR) content, virtual reality (VR) content, etc. For example, a spherical video can capture a 360 degree view of a scene. Virtual content may include one or more objects within scenes in the virtual content. Conventional approaches specifically arising in the realm of computer technology may provide virtual content without identifying such objects within scenes in the virtual content. Therefore, conventional approaches may not provide related content or information in connection with objects included in virtual content.

An improved approach rooted in computer technology can overcome the foregoing and other disadvantages associated with conventional approaches specifically arising in the realm of computer technology. Based on computer technology, the disclosed technology can identify one or more objects within virtual content items and provide related content items in connection with the one or more objects. A virtual content item can represent a virtual three-dimensional (3D) space. The virtual 3D space can include one or more objects. In some embodiments, objects presented in virtual content items can be detected based on object recognition or detection (e.g., based on machine learning techniques). In other embodiments, objects presented in virtual content items can be defined based on user input. In certain embodiments, objects (e.g., virtual objects) can be created and added to virtual content items. The disclosed technology can provide related content items in connection with identified objects in virtual content items. Related content items can be overlaid or otherwise nested in virtual content items. Related content items can include any type of content, such as two-dimensional (2D) content, 3D content, etc. Examples of related content items can include videos, images, spherical videos, VR, etc. In some embodiments, a related content item can be presented within a virtual 3D space of a virtual content item. A related content item can have coordinates within the virtual 3D space, for example, in relation to an identified object. A related content item can have a horizontal coordinate, a vertical coordinate, and a depth coordinate. The coordinates of a related content item can be relative to a point of view within the virtual content item, such as a point of a view of a user presented with the virtual 3D space. In other embodiments, a related content item can also be a virtual content item, such as a spherical video, and presentation of a related content item can be triggered within the virtual content item in which the related content item is nested. A user interface can switch or transition from presenting the virtual content item to presenting the related content item. After presenting the related content item stops, the user interface can return to presenting the virtual content item. Since a virtual content item can represent a virtual 3D space, a virtual content item can be a content item for consumption as well as an environment in which other content items can be provided. Accordingly, related content items can be provided or nested within virtual content items, and the disclosed technology can provide various types of interactions with related content items. In this way, the disclosed technology can provide related content items associated with identified objects identified within virtual content items. Details relating to the disclosed technology are explained below.

FIG. 1 illustrates an example system 100 including an example nested content module 102 configured to provide related content items associated with objects included in virtual content items, according to an embodiment of the present disclosure. The nested content module 102 can include a virtual content module 104, an object identification module 106, and a nested content item module 106. In some instances, the example system 100 can include at least one data store 120. The components (e.g., modules, elements, steps, blocks, etc.) shown in this figure and all figures herein are exemplary only, and other implementations may include additional, fewer, integrated, or different components. Some components may not be shown so as not to obscure relevant details. In various embodiments, one or more of the functionalities described in connection with the nested content module 102 can be implemented in any suitable combinations. The disclosed technology can apply to any type of content as well as any type of system, including a social networking system.

A content item in accordance with the present technology can be any type of content item. Types of content items can include an image (e.g., two dimensional (2D) image), a video (e.g., 2D videos), virtual content (e.g., panoramic photos, 360 photos, photo spheres, 360 videos, virtual reality (VR) environments), audio, or a combination thereof. The virtual content can be any content that provides an immersive experience. For example, the virtual content can capture a field of view of various degrees (e.g., 180 degrees, 225 degrees, 360 degrees, etc.) and/or presents any three-dimensional (3D) content or environments. The virtual content can present an environment of any shape, such as a sphere, a cube, a pyramid, etc. In one example, the virtual content can include a spherical video (or 360 video) that captures a 360 degree view of a scene. Some examples can include videos composed using monoscopic 360 degree views, videos composed using stereoscopic 180 degree views, etc. The spherical video can be created by stitching together various video streams, or feeds, that were captured by cameras that are placed at different locations and/or positions to capture a 360 degree view of the scene. Such video streams may be predetermined for various angles (e.g., 0 degree, 30 degrees, 60 degrees, etc.) of the spherical video. Once stitched together, a user can access the spherical video through a viewport to view a portion of the spherical video at some angle. The portion of the spherical video shown to the user can be determined based on the location and direction of the viewport in three-dimensional space. In another example, virtual content can include virtual reality (VR) content and environments. VR constitutes simulated environments presented through a viewport mounted within headgear or other equipment worn by a user. The simulated environments can be replications of actual places or fictional worlds that are presented via the equipment. A user has the ability to move freely in the simulated environment and to interact with it as desired. A user can interact with the simulated environment through commands provided to the equipment or user gestures detected by the equipment.

The virtual content module 104 can obtain or provide virtual content items for which to identify objects and provide related content items. As explained above, virtual content items can include spherical videos, VR content items, etc. For example, users of a system, such as a social networking system, can create and upload spherical videos to a content sharing platform. As another example, entities (e.g., content publishers) can create and provide VR content items on a content sharing platform. In some embodiments, virtual content items can be live content. For example, a virtual content item can be uploaded as it is being recorded. The virtual content module 104 can determine virtual content items for which to identify objects. In some embodiments, objects can be identified for all virtual content items. In other embodiments, objects can be identified for virtual content items that satisfy certain criteria. Criteria for determining which virtual content items should be selected for object identification can include any type of criteria. For example, the criteria can be based on attributes associated with virtual content items, attributes associated with users and/or entities that created virtual content items, etc.

The object identification module 106 can identify objects within virtual content items. Object within virtual content items can be identified based on various techniques. Techniques for identifying objects within virtual content items can include object detection, object definition, and object creation. In some embodiments, the object identification module 106 can identify objects within virtual content items in or near real time. For example, objects within a virtual content item can be identified in real time as the virtual content item is being recorded and uploaded to a server. The object identification module 106 is described in more detail herein.

The nested content item module 108 can provide related content items for objects identified within virtual content items. Related content items can be nested within virtual content items and presented in various formats. For example, a related content item can be presented as a 2D content item within a virtual content item. In another example, a related content item can be presented as a 3D content item, such as a virtual object, within a virtual content item. In an additional example, a related content item can also be a virtual content item, such as a spherical video, and the related content item can be accessed from within the virtual content item. For instance, if presentation of the related content item is triggered, a user interface can pause presentation of the virtual content item and present the related content item. In some embodiments, nested content items can be provided in a layer that is created for a virtual content item. For example, a layer can be created on top of a virtual content item in order to provide metadata and/or information relating to related content items. In certain embodiments, the nested content item module 108 can identify objects within virtual content items in or near real time. For example, related content items can be determined and provided within a virtual content item in real time as the virtual content item is being recorded and uploaded to a server. The nested content item module 108 is described in more detail herein. All examples herein are provided for illustrative purposes, and there can be many variations and other possibilities.

In some embodiments, the nested content module 102 can be implemented, in part or in whole, as software, hardware, or any combination thereof. In general, a module as discussed herein can be associated with software, hardware, or any combination thereof. In some implementations, one or more functions, tasks, and/or operations of modules can be carried out or performed by software routines, software processes, hardware, and/or any combination thereof. In some cases, the nested content module 102 can be, in part or in whole, implemented as software running on one or more computing devices or systems, such as on a server system or a client computing device. In some instances, the nested content module 102 can be, in part or in whole, implemented within or configured to operate in conjunction or be integrated with a social networking system (or service), such as a social networking system 630 of FIG. 6. Likewise, in some instances, the nested content module 102 can be, in part or in whole, implemented within or configured to operate in conjunction or be integrated with a client computing device, such as the user device 610 of FIG. 6. For example, the nested content module 102 can be implemented as or within a dedicated application (e.g., app), a program, or an applet running on a user computing device or client computing system. It should be understood that many variations are possible.

The data store 120 can be configured to store and maintain various types of data, such as the data relating to support of and operation of the nested content module 102. The data maintained by the data store 120 can include, for example, information relating to virtual content items, objects included in virtual content items (e.g., detected objects, defined objects, created objects, etc.), object detection, object definition, object creation, related content items, coordinates or positions of related content items, etc. The data store 120 also can maintain other information associated with a social networking system. The information associated with the social networking system can include data about users, social connections, social interactions, locations, geo-fenced areas, maps, places, events, groups, posts, communications, content, account settings, privacy settings, and a social graph. The social graph can reflect all entities of the social networking system and their interactions. As shown in the example system 100, the nested content module 102 can be configured to communicate and/or operate with the data store 120. In some embodiments, the data store 120 can be a data store within a client computing device. In some embodiments, the data store 120 can be a data store of a server system in communication with the client computing device.

Figure 2A:
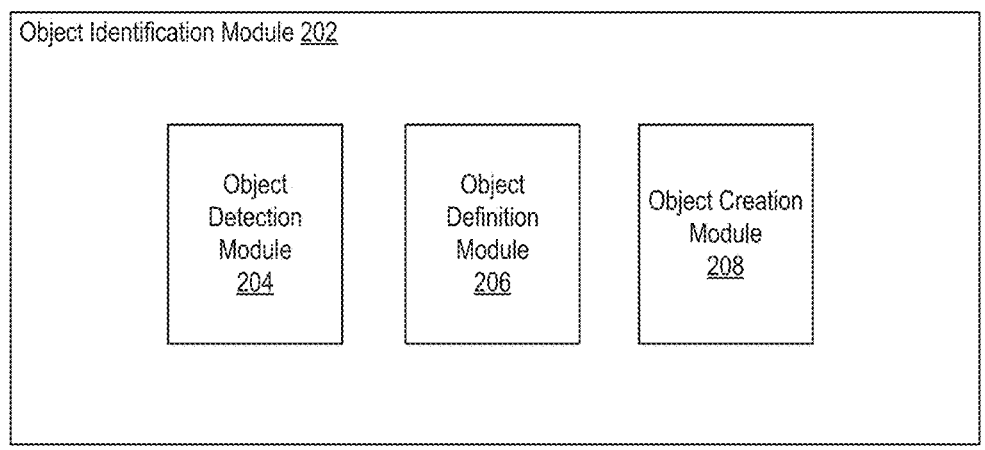
FIG. 2A illustrates an example object identification module configured to identify objects within virtual content items, according to an embodiment of the present disclosure.

FIG. 2A illustrates an example object identification module 202 configured to identify objects within virtual content items, according to an embodiment of the present disclosure. In some embodiments, the object identification module 106 of FIG. 1 can be implemented with the example object identification module 202. As shown in the example of FIG. 2A, the example object identification module 202 can include an object detection module 204, an object definition module 206, and an object creation module 208.

The object identification module 202 can identify objects within virtual content items based on various techniques, such as object detection, object definition, and object creation. Various techniques for identifying objects can be used separately or in combination. In some embodiments, objects can be identified by using object recognition or detection techniques. In certain embodiments, objects can be identified by defining objects within virtual content items based on user input. In other embodiments, objects can be identified by creating objects to add to virtual content items. The object identification module 202 can identify any type of object. In some embodiments, objects can include logos, brands, products, etc. Objects can be 2D or 3D objects.

The object detection module 204 can detect objects within virtual content items. The object detection module 204 can detect objects within a content item based on object recognition or detection. The object detection module 104 can detect objects within a virtual content item based on a machine learning model. In some embodiments, the machine learning model can be a classifier. The machine learning model can be trained based on training data that includes objects and associated images. The trained machine learning model can be applied to images of objects from virtual content items in order to determine objects included within virtual content items. In some embodiments, objects can be detected at a time a virtual content item is created. For example, the object detection module 204 can perform object detection when a spherical video is uploaded to a server (e.g., during live recording or after recording). In other embodiments, objects can be detected at a time a virtual content item is presented to a user. For example, the object detection module 204 can perform object detection during an initial presentation of the virtual content item and store information relating to detected objects. As another example, the object detection module can 204 perform object detection for each time the virtual content item is presented. In some cases, objects can move from one scene to another, and objects can be tracked between scenes in order to detect objects. All examples herein are provided for illustrative purposes, and there can be many variations and other possibilities.

The object definition module 206 can define objects within virtual content items. In some cases, a user may want to designate certain objects within virtual content items for which to provide related virtual content items. The object definition module 106 can allow users or administrators of a system, such as a social networking system, to define objects that are presented within virtual content items. For example, a virtual content item can include a particular object in a scene captured from the real world, and a user can designate the particular object as an object for which a related virtual content item can be provided. All examples herein are provided for illustrative purposes, and there can be many variations and other possibilities.

The object creation module 208 can create objects within virtual content items. Created objects can be virtual objects within virtual content items. A created object can have any shape or properties. In some embodiments, a created object can be a 2D object. In other embodiments, a created object can be a 3D object. In some embodiments, a created object can have a predetermined 2D or 3D geometric shape, such as a square, a rectangle, a circle, a cube, a sphere, etc. In other embodiments, a created object can have a shape of a 2D or 3D object from the real world. A created object can be added within a virtual content item. Coordinates of a created object within a virtual content item can be determined. For example, coordinates of the created object within a virtual 3D space of the virtual content item can be determined. Determining coordinates of a created object within a virtual content item can be similar to determining coordinates of related content items within a virtual content item as explained below. A created object within a virtual content item can be identified as an object for which a related content item can be provided. In some embodiments, created objects can act as display or presentation surfaces for related content items. For example, a created object can be a cube, and a related content item can be presented on a surface of the cube. All examples herein are provided for illustrative purposes, and there can be many variations and other possibilities.

Figure 2B:
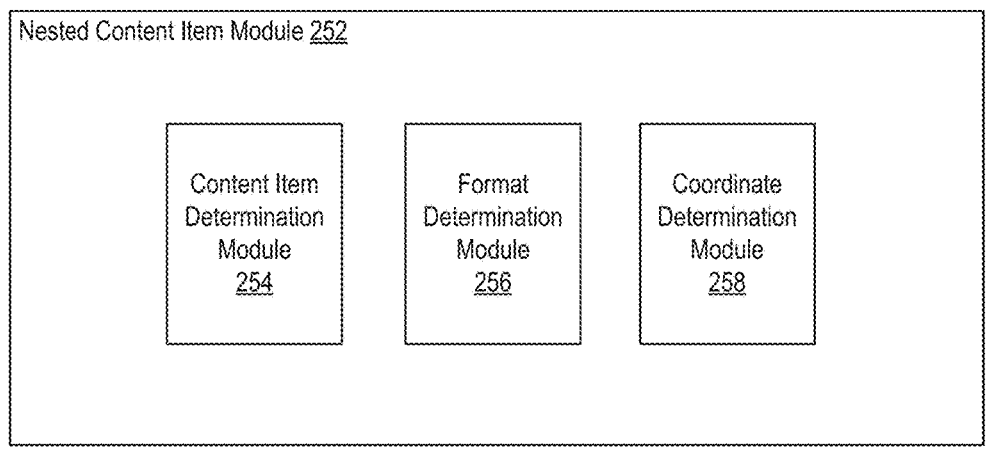
FIG. 2B illustrates an example nested content item module configured to provide related content items for objects identified within virtual content items, according to an embodiment of the present disclosure.

FIG. 2B illustrates an example nested content item module 252 configured to provide related content items for objects identified within virtual content items, according to an embodiment of the present disclosure. In some embodiments, the nested content item module 108 of FIG. 1 can be implemented with the example nested content item module 252. As shown in the example of FIG. 2B, the example nested content item module 252 can include a content item determination module 254, a format determination module 256, and a coordinate determination module 258.

The content item determination module 254 can determine related content items to provide in connection with identified objects. One or more related content items can be determined for an identified object. A related content item can include any type of information that can be provided in connection with an identified object. Examples of related content items can include advertisements, product information, representations of products, etc. Related content items can be determined or selected based on various criteria. For example, related content items can be selected from one or more candidate content items if the related content items satisfy certain criteria. Criteria for determining related content items can include attributes associated with identified objects, attributes associated with content items, attributes associated with users, etc. Examples of attributes associated with content items can include content, subject matter, keywords, targeting criteria, etc. Examples of attributes associated with users can include an age, an age range, a gender, a geographical region (e.g., country, state, city, etc.), an interest, etc. The content item determination module 254 can determine related content items dynamically during presentation or playback of virtual content items by users.

The content item determination module 254 can determine related content items for some or all identified objects within a virtual content item. In some embodiments, the content item determination module 254 can provide related content items for all identified objects. In other embodiments, the content item determination module 254 can provide related content items for selected objects of all identified objects. For example, objects for which to provide related content items can be determined based on various criteria. Criteria for determining whether to provide related content items for an identified object can include any type of criteria. For example, the criteria can be based on attributes associated with identified objects, attributes associated with virtual content items that include identified objects, attributes associated with users and/or entities that created virtual content items, attributes associated with users and/or entities that access virtual content items, etc.

The format determination module 256 can determine formats in which to present related content items. Formats in which related content items are presented can include a 2D format, a 3D format, etc. In some embodiments, a format for presenting a related content item can correspond to a format of the related content item. For example, if a related content item is a 2D content item, the related content item can be presented in a 2D format. As another example, if a related content item is a 3D content item, the related content item can be presented in a 3D format. In yet another example, if a related content item is a virtual content item, such as a spherical video, the related content item can be presented in a 3D format. For instance, presentation of the related virtual content item can be triggered within the virtual content item, and a user interface can pause presentation of the virtual content item and present the related virtual content item. For example, the user interface can switch from presenting the virtual content item to presenting the related content item, and resume presenting the virtual content item after presentation of the related content item stops or completes. In some cases, the related virtual content item may be presented in a virtual 3D space of the virtual content item. In other embodiments, a format for presenting a related content item can be different from a format of the related content item. For example, a 2D content item can be mapped to a 3D surface. As another example, a 3D content item can be mapped to a 2D surface. Many variations are possible.

In certain embodiments, the format determination module 256 can select a format for presenting a related content item based on an identified object. In some cases, an identified object can be a created object that was added to a virtual content item. In such cases, a format for presenting a related content item can be tailored to the shape of the identified object and/or a display or presentation surface associated with the identified object. For example, the identified object can be a cube, and a related content item can be presented on a surface of the cube. The related content item can be a 2D content item, a 3D content item (e.g., a virtual object), a virtual content item, etc. The related content item can be adjusted or modified such that the related content item can be mapped to the surface of the cube. For example, a 2D version of a 3D content item can be displayed on the surface of the cube. The related content item displayed on the surface of the cube can be provided in its original format, for example, in response to user selection.

The coordinate determination module 258 can determine coordinates of related content items within virtual content items. Coordinates of a related content item can be coordinates within a virtual 3D space of a virtual content item. A virtual 3D space of a virtual content item can be defined by any suitable coordinate system. For example, a position in the virtual 3D space can be defined or specified by coordinates along a horizontal axis (or x-axis), a vertical axis (or y-axis), and a depth axis (or a z-axis). Since a related content item is provided within a virtual 3D space of a virtual content item, a related content item can have a placement or position within the virtual 3D space. The position of the related content item within the virtual 3D space can be defined by a set of coordinates. For example, the related content item can have a horizontal coordinate on the horizontal axis, a vertical coordinate on the vertical axis, and a depth coordinate on the depth axis. The coordinate determination module 258 can define coordinates of a related content item relative to a point of view (e.g., a virtual camera position) within a virtual content item. A point of view can be a point of view of a user, a point of view of an avatar of a user, a viewport, an over the shoulder view, a bird's eye view, etc. A point of view can provide a reference with respect to which coordinates of a related content item can be defined. For example, a point of view can be defined by a horizontal coordinate, a vertical coordinate, and a depth coordinate. A horizontal coordinate, a vertical coordinate, and a depth coordinate of a related content item can be defined relative to coordinates of the point of view. While Cartesian coordinates have been described as an illustration, the position of related content items in virtual 3D space can be specified based on any suitable coordinate system, such as a spherical coordinate system.

The coordinate determination module 258 can determine a position of a related content item based on an identified object associated with the related content item. An identified object associated with a related content item can also have a position within a virtual 3D space of a virtual content item. The position of the identified object within the virtual 3D space can be defined by a horizontal coordinate, a vertical coordinate, and a depth coordinate. The coordinates of the related content item can be determined based on the coordinates of the identified object. For example, the related content item can be placed in close proximity (e.g., within a predetermined distance) of the identified object to indicate the related content item is related to the identified object.

The nested content item module 252 can provide determined related content items in connection with identified objects. A related content item of an identified object can be presented to a user if the user selects or interacts with the identified object. A user can select or otherwise interact with an identified object in various ways. For example, a user can select or interact with an identified object using a command, a gesture, a gaze, etc. Many variations are possible. An indicator can be provided to indicate that a related content item is available for an identified object. In some embodiments, an indicator can be provided as a part of an identified object. For example, an indicator can be an effect for an identified object, such as flashing, moving, etc. In other embodiments, an indicator can be provided as a separate object from an identified object. In such embodiments, a user can select an indicator in order to access a related content item for an identified object. For example, an indicator can be a marker near an identified object. There can be various types of indicators, such as visual indicators, audio indicators, etc. Presentation of a virtual content item in which a related content item is nested can pause or stop temporarily while the related content item is presented to a user.

The nested content item module 252 can provide various types of interactions with related content items nested in virtual content items. Related content items can be provided in many different formats within a virtual content item, as explained above. Accordingly, different types of interactions with related content items can be possible for users. In one example, a user can interact with an identified object in a virtual content item, and a 2D or a 3D related content item can be provided within a virtual 3D space of the virtual content item. The user can interact with the 2D or 3D related content item in various ways (e.g., view, select, etc.). In another example, a user can interact with an identified object in a virtual content item to access a related virtual content item, and the related virtual content item can be displayed in a user interface. Some examples of different types of interactions are described below. All examples herein are provided for illustrative purposes, and there can be many variations and other possibilities.

Figure 3A:
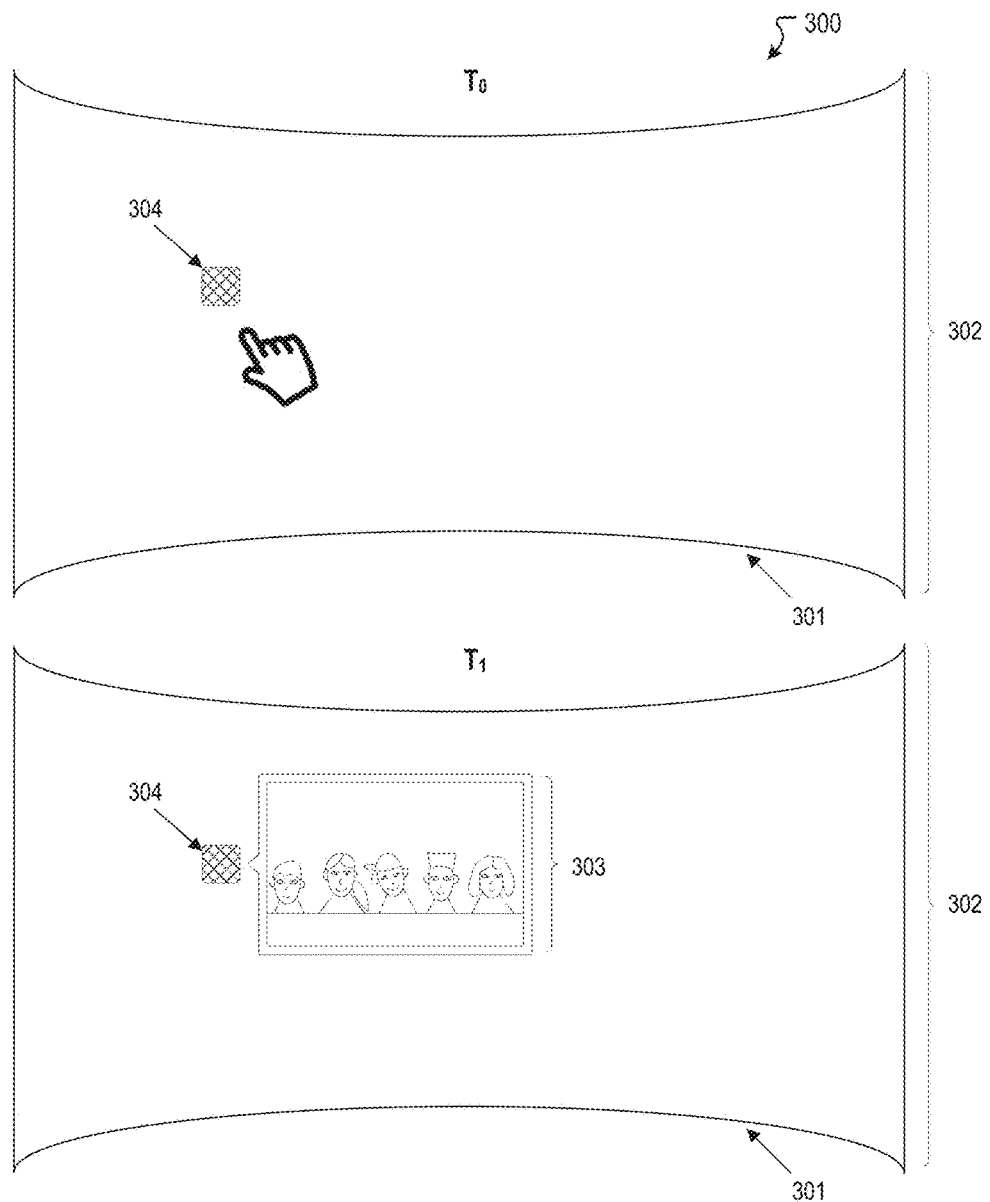
FIG. 3A illustrates an example scenario for providing a related content item within a virtual content item, according to an embodiment of the present disclosure.

FIG. 3A illustrates an example scenario 300 for providing a related content item within a virtual content item, according to an embodiment of the present disclosure. In the example scenario 300, a related content item is provided for an identified object included within a virtual content item. The example scenario 300 shows a user interface 301 at two different points in time $T_0$ and $T_1$. At $T_0$, the user interface 301 is presenting a virtual content item 302. For example, the virtual content item 302 can be a spherical video or a VR content item. The virtual content item 302 includes an object 304 at $T_0$. The object 304 can be identified based on various techniques as described above. The object 304 is shown as an arbitrary shape for illustrative purposes, but the object 304 can have any shape or appearance. A related content item 303 can be determined for the object 304. Although not shown, an indicator can be provided to indicate that the related content item 303 is available for the object 304. As described above, the indicator can be an effect associated with the object 304, can be a separate object, etc. At $T_1$, the user interface 301 presents the related content item 303 within the virtual content item 302. For example, the presentation of the related content item 303 can be triggered in response to user selection of or interaction with the object 304. The related content item 303 is nested within a virtual 3D space of the virtual content item 302. The related content item 303 has coordinates within the virtual 3D space. The related content item 303 can be a 2D content item or a 3D content item within the virtual content item 302. The presentation of the virtual content item 302 can pause while the related content item 303 is presented.

The disclosed technology can have various applications. For example, the disclosed technology and the example scenario 300 can apply to providing dynamic advertisements, shopping experiences, etc. In an example, the object 304 can be a logo or a brand, and the related content item 303 can be an advertisement. In another example, the object 304 can be a logo or a brand, and the related content item 303 can present information about one or more products associated with the logo or the brand. The related content item 303 can provide a link or a button for purchasing one or more products. In an additional example, the object 304 can be a logo or a brand, and the related content item 303 can present a representation of a product associated with the logo or the brand. In this example, a user can purchase the product by selecting and dragging the related content item 303. For instance, a shopping cart can appear within the virtual content item 302, and the user can drag the related content item 304 into the shopping cart. In a further example, the object 304 can be a product associated with a logo or a brand, and the related content item 303 can present information about the product. A user can purchase the product by selecting and dragging the object 304. For instance, a shopping cart can appear within the virtual content item 302, and the user can drag the object 304 into the shopping cart. All examples herein are provided for illustrative purposes, and there can be many variations and other possibilities. For example, the examples provided above can be used separately or in combination.

Figure 3B:
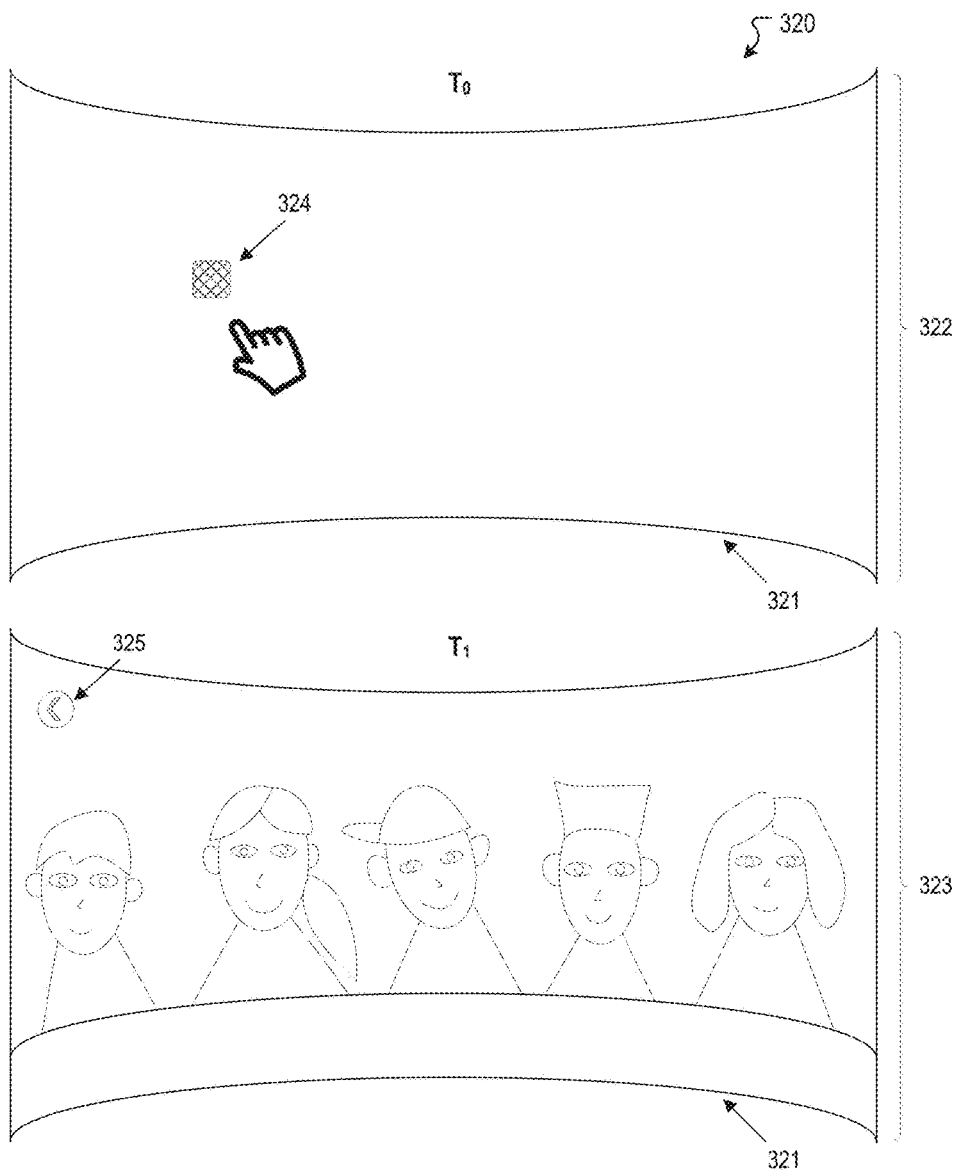
FIG. 3B illustrates an example scenario for providing a related virtual content item within a virtual content item, according to an embodiment of the present disclosure.

FIG. 3B illustrates an example scenario 320 for providing a related virtual content item within a virtual content item, according to an embodiment of the present disclosure. In the example scenario 320, a related virtual content item is provided for an identified object included within a virtual content item. The example scenario 320 shows a user interface 321 at two different points in time $T_0$ and $T_1$. At $T_0$, the user interface 321 is presenting a virtual content item 322. For example, the virtual content item 322 can be a spherical video or a VR content item. The virtual content item 322 includes an object 324 at $T_0$. The object 324 can be identified based on various techniques as described above. The object 324 is shown as an arbitrary shape for illustrative purposes, but the object 324 can have any shape or appearance. A related virtual content item can be determined for the object 324. An indicator can be provided to indicate that a related virtual content item is available for the object 324. As described above, the indicator can be an effect associated with the object 324, can be a separate object, etc. At $T_1$, the user interface 321 presents the related virtual content item 323. For example, the presentation of the related virtual content item 323 can be triggered in response to user selection of or interaction with the object 324 or an indicator associated with the object 324. Presentation of the virtual content item 322 can pause while the related virtual content item 323 is presented. The user interface 321 can return to presenting the virtual content item 322 after presentation of the related virtual content item 323 is completed or in response to user dismissal of the related virtual content item 323. For example, a user can select an icon 325 (e.g., a chevron) to stop presentation of the related virtual content item 323. In some embodiments, the related virtual content item 323 can be presented within the virtual 3D space of the virtual content item 322. For example, the related virtual content item 323 can have coordinates within a virtual 3D space of the virtual content item 322. All examples herein are provided for illustrative purposes, and there can be many variations and other possibilities.

Figure 3C:
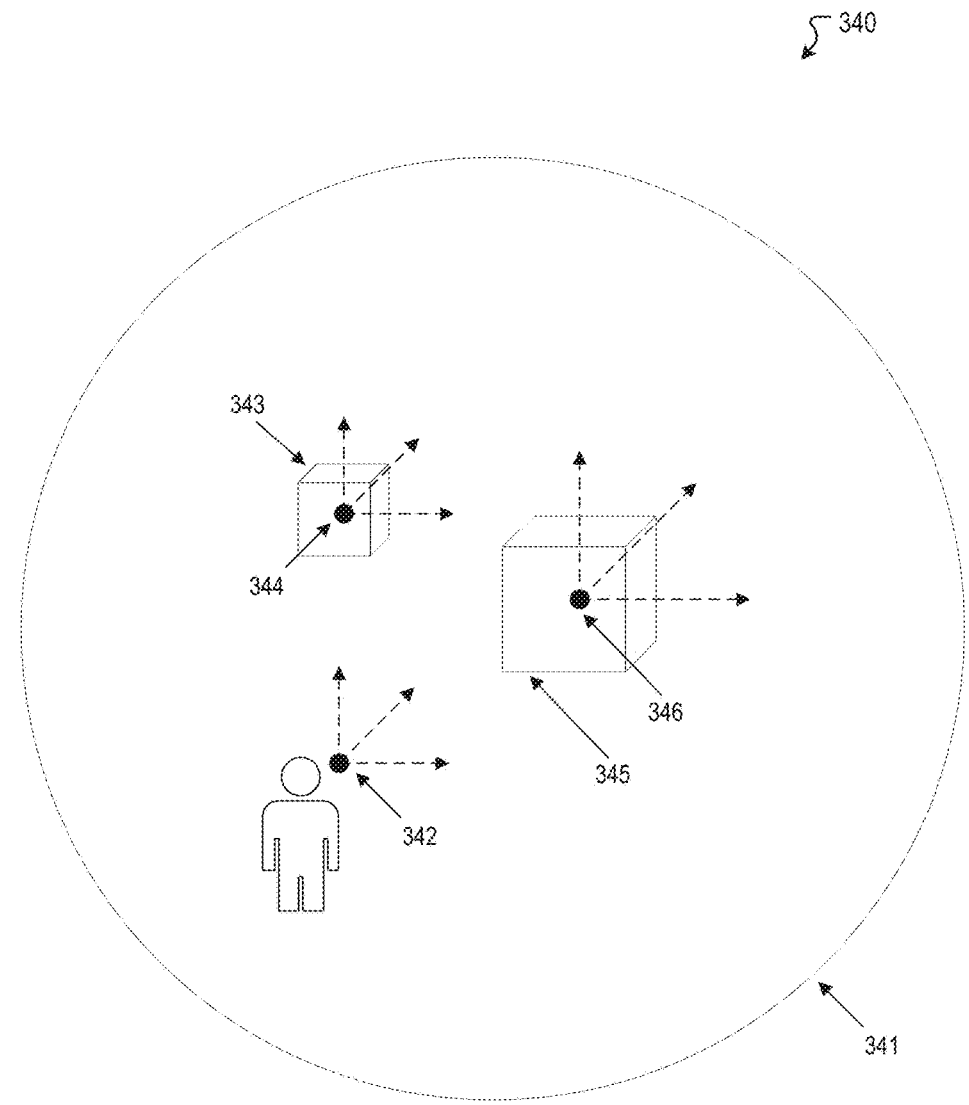
FIG. 3C illustrates an example scenario for determining three-dimensional coordinates for a content item within a virtual content item, according to an embodiment of the present disclosure.

FIG. 3C illustrates an example scenario 340 for determining three-dimensional coordinates for a content item within a virtual content item, according to an embodiment of the present disclosure. In the example scenario 340, a related content item 345 is provided for an identified object 343 included within a virtual content item 341. For example, the virtual content item 341 can be a spherical video or a VR content item. A point of view 342 can be defined by horizontal, vertical, and depth coordinates. The object 343 and the related content item 345 can have respective positions within a virtual 3D space of the virtual content item 341. For example, a position 344 of the object 343 within the virtual 3D space is defined by horizontal, vertical, and depth coordinates for the object 343. Similarly, a position 346 of the related content item 345 within the virtual 3D space is defined by horizontal, vertical, and depth coordinates for the related content item 345. The positions 344 of the object 343 and the position 346 of the related content item 345 can be determined relative to the point of view 342. The object 343 and the related content item 345 can also have positions relative to each other. The example scenario shows one related content item 345 for the object 343, but multiple related content items for the object 343 can be provided. For instance, object 343 can be a logo or a brand, and multiple related content items can be 3D models of products for the logo or the brand. Each of the multiple related content items can have a position in the virtual 3D space of the virtual content item 341. All examples herein are provided for illustrative purposes, and there can be many variations and other possibilities.

Figure 3D:
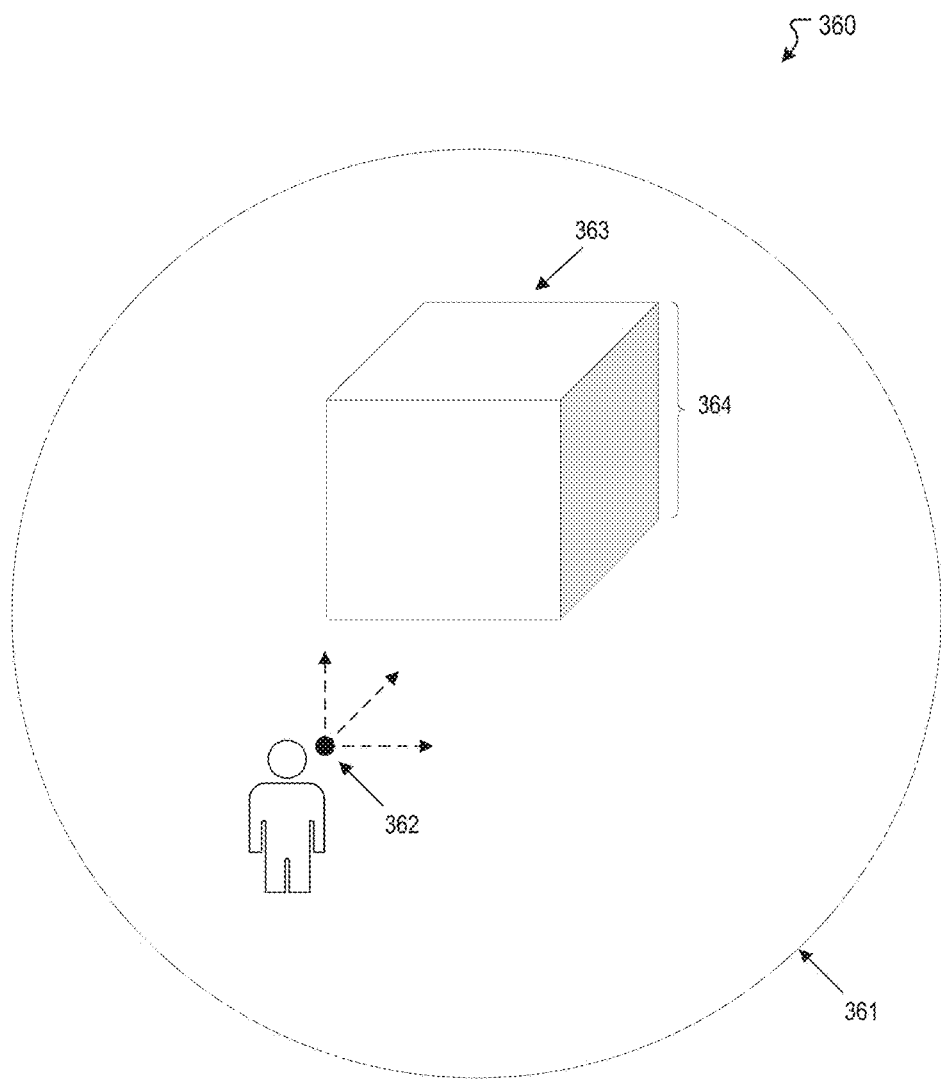
FIG. 3D illustrates an example scenario for providing a created object within a virtual content item, according to an embodiment of the present disclosure.

FIG. 3D illustrates an example scenario 360 for providing a created object within a virtual content item, according to an embodiment of the present disclosure. In the example scenario 360, a created object 363 is provided within a virtual content item 361. For example, the virtual content item 361 can be a spherical video or a VR content item. A point of view 362 can be defined by horizontal, vertical, and depth coordinates. The created object 363 can have a position within a virtual 3D space of the virtual content item 361, which can be defined by horizontal, vertical, and depth coordinates. In some embodiments, the created object 363 can be a placeholder for presenting related content items. A related content item 364 can be provided as a part of the created object 363. In the example scenario 360, the created object 363 is a cube, and the related content item 364 is provided on a surface of the cube. The surface on which the related content item 364 is provided is shaded in FIG. 3D. Each surface of the cube can be used to provide a related content item. Since not all surfaces are visible to a user at the same time, appropriate related content items can be provided based on the user's point of view. For example, if the virtual content item 361 is a VR content item, the user can walk around the cube in the VR environment, and related content items can be provided on one or more visible surfaces of the cube. In some embodiments, the related content item 364 can be a 2D content item, such as a video or an image. In certain embodiments, a preview of the related content item 364 is provided on the surface of the cube, and the actual related content item 364 is presented when the user selects or interacts with the surface. In some embodiments, the related content item 364 can move from the created object 363 to another created object as the user moves through the VR environment. There can be various applications for created objects within virtual content items. In an example, the created object 363 can be a placeholder or slot in the virtual content item 361 for advertisements. If the created object 363 is a cube, the created object 363 can provide six different advertisements. In another example, the created object 363 can be a placeholder or slot in the virtual content item 361 for products. If the created object 363 is a cube, the created object 363 can show six different products. A user can interact with a product and purchase the product. All examples herein are provided for illustrative purposes, and there can be many variations and other possibilities.

Figure 4:
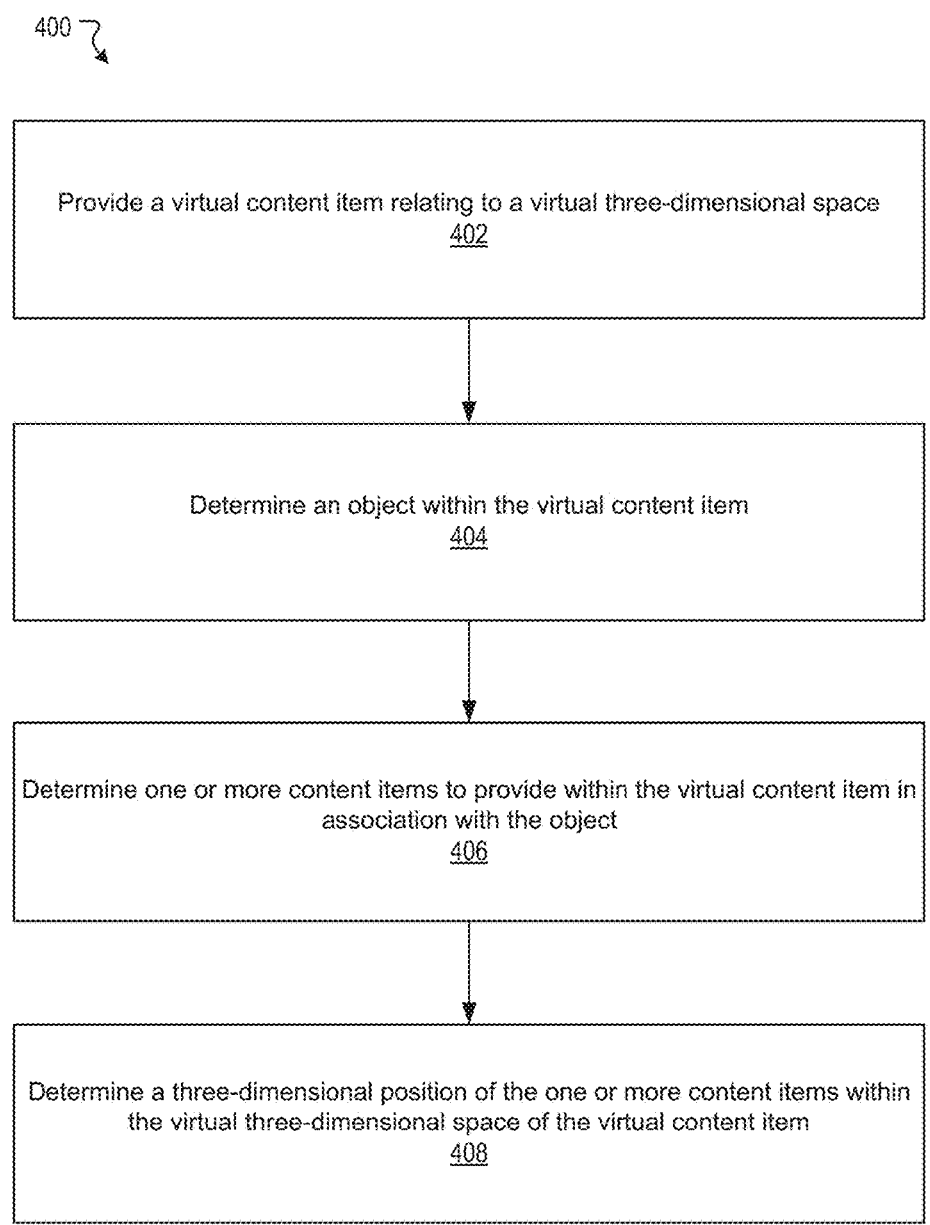
FIG. 4 illustrates an example first method for providing related content items associated with objects included in virtual content items, according to an embodiment of the present disclosure.

FIG. 4 illustrates an example first method 400 for providing related content items associated with objects included in virtual content items, according to an embodiment of the present disclosure. It should be understood that there can be additional, fewer, or alternative steps performed in similar or alternative orders, or in parallel, based on the various features and embodiments discussed herein unless otherwise stated.

At block 402, the example method 400 can provide a virtual content item relating to a virtual three-dimensional space. At block 404, the example method 400 can determine an object within the virtual content item. At block 406, the example method 400 can determine one or more content items to provide within the virtual content item in association with the object. At block 408, the example method 400 can determine a three-dimensional position of the one or more content items within the virtual three-dimensional space of the virtual content item. Other suitable techniques that incorporate various features and embodiments of the present disclosure are possible.

Figure 5:
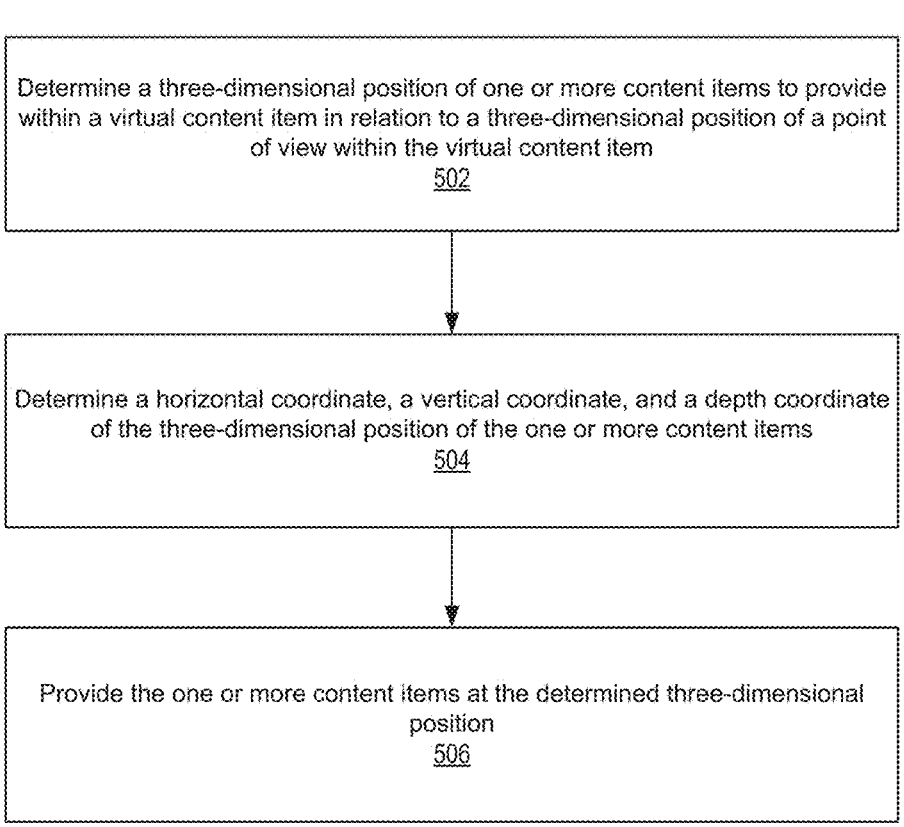
FIG. 5 illustrates an example second method for providing related content items associated with objects included in virtual content items, according to an embodiment of the present disclosure.

FIG. 5 illustrates an example second method 500 for providing related content items associated with objects included in virtual content items, according to an embodiment of the present disclosure. It should be understood that there can be additional, fewer, or alternative steps performed in similar or alternative orders, or in parallel, based on the various features and embodiments discussed herein unless otherwise stated. Certain steps of the method 500 may be performed in combination with the example method 400 explained above.

At block 502, the example method 500 can determine a three-dimensional position of one or more content items to provide within a virtual content item in relation to a three-dimensional position of a point of view within the virtual content item. The one or more content items can be similar to the one or more content items explained in connection with FIG. 4. The virtual content item can be similar to the virtual content item explained in connection with FIG. 4. The three-dimensional position of the one or more content items can be similar to the three-dimensional position of the one or more content items explained in connection with FIG. 4. At block 504, the example method 500 can determine a horizontal coordinate, a vertical coordinate, and a depth coordinate of the three-dimensional position of the one or more content items. At block 506, the example method 500 can provide the one or more content items at the determined three-dimensional position. Other suitable techniques that incorporate various features and embodiments of the present disclosure are possible.

It is contemplated that there can be many other uses, applications, features, possibilities, and/or variations associated with various embodiments of the present disclosure. For example, users can, in some cases, choose whether or not to opt-in to utilize the disclosed technology. The disclosed technology can, for instance, also ensure that various privacy settings, preferences, and configurations are maintained and can prevent private information from being divulged. In another example, various embodiments of the present disclosure can learn, improve, and/or be refined over time.

SOCIAL NETWORKING SYSTEM—EXAMPLE IMPLEMENTATION

Figure 6:
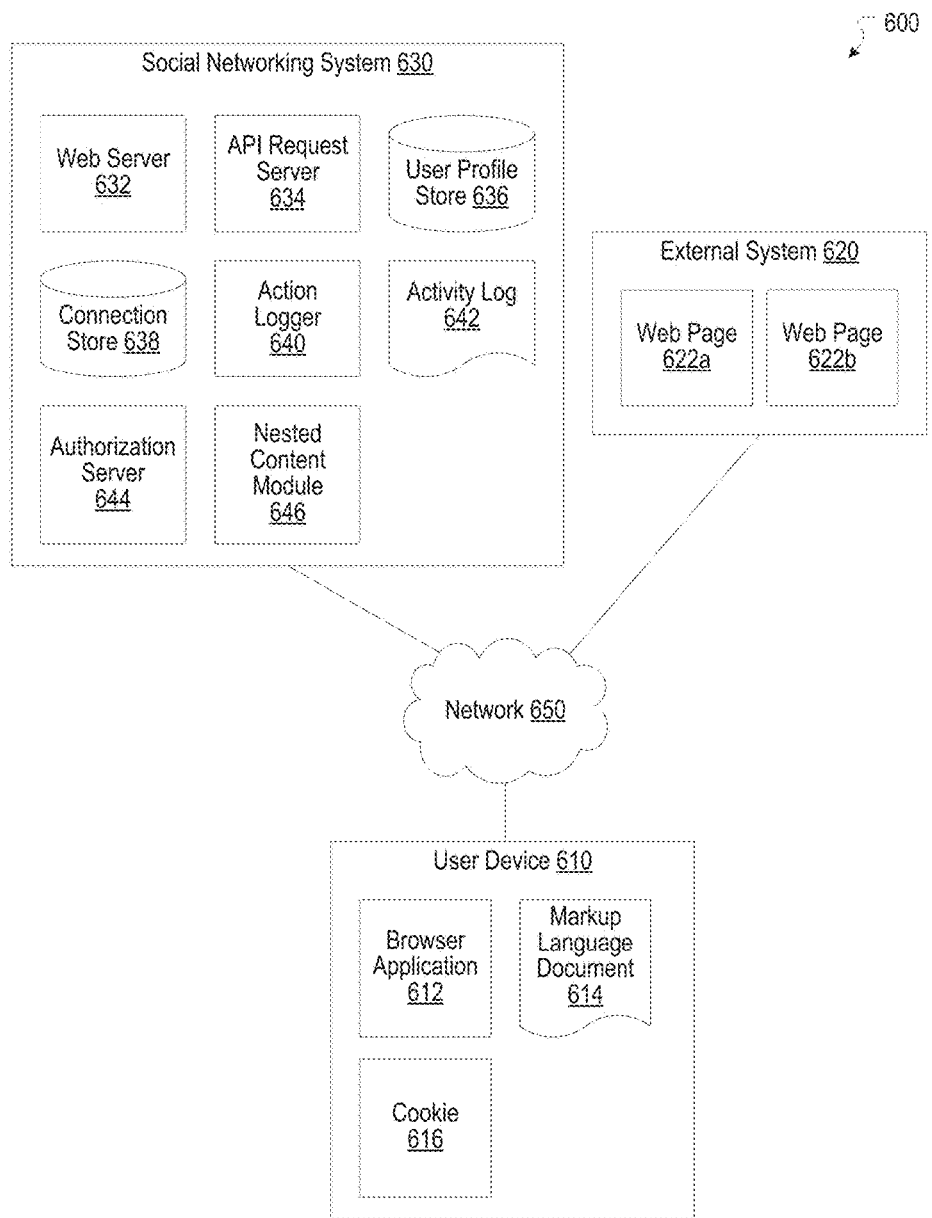
FIG. 6 illustrates a network diagram of an example system that can be utilized in various scenarios, according to an embodiment of the present disclosure.

FIG. 6 illustrates a network diagram of an example system 600 that can be utilized in various scenarios, in accordance with an embodiment of the present disclosure. The system 600 includes one or more user devices 610, one or more external systems 620, a social networking system (or service) 630, and a network 650. In an embodiment, the social networking service, provider, and/or system discussed in connection with the embodiments described above may be implemented as the social networking system 630. For purposes of illustration, the embodiment of the system 600, shown by FIG. 6, includes a single external system 620 and a single user device 610. However, in other embodiments, the system 600 may include more user devices 610 and/or more external systems 620. In certain embodiments, the social networking system 630 is operated by a social network provider, whereas the external systems 620 are separate from the social networking system 630 in that they may be operated by different entities. In various embodiments, however, the social networking system 630 and the external systems 620 operate in conjunction to provide social networking services to users (or members) of the social networking system 630. In this sense, the social networking system 630 provides a platform or backbone, which other systems, such as external systems 620, may use to provide social networking services and functionalities to users across the Internet.

The user device 610 comprises one or more computing devices that can receive input from a user and transmit and receive data via the network 650. In one embodiment, the user device 610 is a conventional computer system executing, for example, a Microsoft Windows compatible operating system (OS), Apple OS X, and/or a Linux distribution. In another embodiment, the user device 610 can be a device having computer functionality, such as a smart-phone, a tablet, a personal digital assistant (PDA), a mobile telephone, etc. The user device 610 is configured to communicate via the network 650. The user device 610 can execute an application, for example, a browser application that allows a user of the user device 610 to interact with the social networking system 630. In another embodiment, the user device 610 interacts with the social networking system 630 through an application programming interface (API) provided by the native operating system of the user device 610, such as iOS and ANDROID. The user device 610 is configured to communicate with the external system 620 and the social networking system 630 via the network 650, which may comprise any combination of local area and/or wide area networks, using wired and/or wireless communication systems.

In one embodiment, the network 650 uses standard communications technologies and protocols. Thus, the network 650 can include links using technologies such as Ethernet, 802.11, worldwide interoperability for microwave access (WiMAX), 3G, 4G, CDMA, GSM, LTE, digital subscriber line (DSL), etc. Similarly, the networking protocols used on the network 650 can include multiprotocol label switching (MPLS), transmission control protocol/Internet protocol (TCP/IP), User Datagram Protocol (UDP), hypertext transport protocol (HTTP), simple mail transfer protocol (SMTP), file transfer protocol (FTP), and the like. The data exchanged over the network 650 can be represented using technologies and/or formats including hypertext markup language (HTML) and extensible markup language (XML). In addition, all or some links can be encrypted using conventional encryption technologies such as secure sockets layer (SSL), transport layer security (TLS), and Internet Protocol security (IPsec).

In one embodiment, the user device 610 may display content from the external system 620 and/or from the social networking system 630 by processing a markup language document 614 received from the external system 620 and from the social networking system 630 using a browser application 612. The markup language document 614 identifies content and one or more instructions describing formatting or presentation of the content. By executing the instructions included in the markup language document 614, the browser application 612 displays the identified content using the format or presentation described by the markup language document 614. For example, the markup language document 614 includes instructions for generating and displaying a web page having multiple frames that include text and/or image data retrieved from the external system 620 and the social networking system 630. In various embodiments, the markup language document 614 comprises a data file including extensible markup language (XML) data, extensible hypertext markup language (XHTML) data, or other markup language data. Additionally, the markup language document 614 may include JavaScript Object Notation (JSON) data, JSON with padding (JSONP), and JavaScript data to facilitate data-interchange between the external system 620 and the user device 610. The browser application 612 on the user device 610 may use a JavaScript compiler to decode the markup language document 614.

The markup language document 614 may also include, or link to, applications or application frameworks such as FLASH™ or Unity™ applications, the SilverLight™ application framework, etc.

In one embodiment, the user device 610 also includes one or more cookies 616 including data indicating whether a user of the user device 610 is logged into the social networking system 630, which may enable modification of the data communicated from the social networking system 630 to the user device 610.

The external system 620 includes one or more web servers that include one or more web pages 622a, 622b, which are communicated to the user device 610 using the network 650. The external system 620 is separate from the social networking system 630. For example, the external system 620 is associated with a first domain, while the social networking system 630 is associated with a separate social networking domain. Web pages 622a, 622b, included in the external system 620, comprise markup language documents 614 identifying content and including instructions specifying formatting or presentation of the identified content.

The social networking system 630 includes one or more computing devices for a social network, including a plurality of users, and providing users of the social network with the ability to communicate and interact with other users of the social network. In some instances, the social network can be represented by a graph, i.e., a data structure including edges and nodes. Other data structures can also be used to represent the social network, including but not limited to databases, objects, classes, meta elements, files, or any other data structure. The social networking system 630 may be administered, managed, or controlled by an operator. The operator of the social networking system 630 may be a human being, an automated application, or a series of applications for managing content, regulating policies, and collecting usage metrics within the social networking system 630. Any type of operator may be used.

Users may join the social networking system 630 and then add connections to any number of other users of the social networking system 630 to whom they desire to be connected. As used herein, the term "friend" refers to any other user of the social networking system 630 to whom a user has formed a connection, association, or relationship via the social networking system 630. For example, in an embodiment, if users in the social networking system 630 are represented as nodes in the social graph, the term "friend" can refer to an edge formed between and directly connecting two user nodes.

Connections may be added explicitly by a user or may be automatically created by the social networking system 630 based on common characteristics of the users (e.g., users who are alumni of the same educational institution). For example, a first user specifically selects a particular other user to be a friend. Connections in the social networking system 630 are usually in both directions, but need not be, so the terms "user" and "friend" depend on the frame of reference. Connections between users of the social networking system 630 are usually bilateral ("two-way"), or "mutual," but connections may also be unilateral, or "one-way." For example, if Bob and Joe are both users of the social networking system 630 and connected to each other, Bob and Joe are each other's connections. If, on the other hand, Bob wishes to connect to Joe to view data communicated to the social networking system 630 by Joe, but Joe does not wish to form a mutual connection, a unilateral connection may be established. The connection between users may be a direct connection; however, some embodiments of the social networking system 630 allow the connection to be indirect via one or more levels of connections or degrees of separation.

In addition to establishing and maintaining connections between users and allowing interactions between users, the social networking system 630 provides users with the ability to take actions on various types of items supported by the social networking system 630. These items may include groups or networks (i.e., social networks of people, entities, and concepts) to which users of the social networking system 630 may belong, events or calendar entries in which a user might be interested, computer-based applications that a user may use via the social networking system 630, transactions that allow users to buy or sell items via services provided by or through the social networking system 630, and interactions with advertisements that a user may perform on or off the social networking system 630. These are just a few examples of the items upon which a user may act on the social networking system 630, and many others are possible. A user may interact with anything that is capable of being represented in the social networking system 630 or in the external system 620, separate from the social networking system 630, or coupled to the social networking system 630 via the network 650.

The social networking system 630 is also capable of linking a variety of entities. For example, the social networking system 630 enables users to interact with each other as well as external systems 620 or other entities through an API, a web service, or other communication channels. The social networking system 630 generates and maintains the "social graph" comprising a plurality of nodes interconnected by a plurality of edges. Each node in the social graph may represent an entity that can act on another node and/or that can be acted on by another node. The social graph may include various types of nodes. Examples of types of nodes include users, non-person entities, content items, web pages, groups, activities, messages, concepts, and any other things that can be represented by an object in the social networking system 630. An edge between two nodes in the social graph may represent a particular kind of connection, or association, between the two nodes, which may result from node relationships or from an action that was performed by one of the nodes on the other node. In some cases, the edges between nodes can be weighted. The weight of an edge can represent an attribute associated with the edge, such as a strength of the connection or association between nodes. Different types of edges can be provided with different weights. For example, an edge created when one user "likes" another user may be given one weight, while an edge created when a user befriends another user may be given a different weight.

As an example, when a first user identifies a second user as a friend, an edge in the social graph is generated connecting a node representing the first user and a second node representing the second user. As various nodes relate or interact with each other, the social networking system 630 modifies edges connecting the various nodes to reflect the relationships and interactions.

The social networking system 630 also includes user-generated content, which enhances a user's interactions with the social networking system 630. User-generated content may include anything a user can add, upload, send, or "post" to the social networking system 630. For example, a user communicates posts to the social networking system 630 from a user device 610. Posts may include data such as status updates or other textual data, location information, images such as photos, videos, links, music or other similar data and/or media. Content may also be added to the social networking system 630 by a third party. Content "items" are represented as objects in the social networking system 630. In this way, users of the social networking system 630 are encouraged to communicate with each other by posting text and content items of various types of media through various communication channels. Such communication increases the interaction of users with each other and increases the frequency with which users interact with the social networking system 630.

The social networking system 630 includes a web server 632, an API request server 634, a user profile store 636, a connection store 638, an action logger 640, an activity log 642, and an authorization server 644. In an embodiment of the invention, the social networking system 630 may include additional, fewer, or different components for various applications. Other components, such as network interfaces, security mechanisms, load balancers, failover servers, management and network operations consoles, and the like are not shown so as to not obscure the details of the system.

The user profile store 636 maintains information about user accounts, including biographic, demographic, and other types of descriptive information, such as work experience, educational history, hobbies or preferences, location, and the like that has been declared by users or inferred by the social networking system 630. This information is stored in the user profile store 636 such that each user is uniquely identified. The social networking system 630 also stores data describing one or more connections between different users in the connection store 638. The connection information may indicate users who have similar or common work experience, group memberships, hobbies, or educational history. Additionally, the social networking system 630 includes user-defined connections between different users, allowing users to specify their relationships with other users. For example, user-defined connections allow users to generate relationships with other users that parallel the users' real-life relationships, such as friends, co-workers, partners, and so forth. Users may select from predefined types of connections, or define their own connection types as needed. Connections with other nodes in the social networking system 630, such as non-person entities, buckets, cluster centers, images, interests, pages, external systems, concepts, and the like are also stored in the connection store 638.

The social networking system 630 maintains data about objects with which a user may interact. To maintain this data, the user profile store 636 and the connection store 638 store instances of the corresponding type of objects maintained by the social networking system 630. Each object type has information fields that are suitable for storing information appropriate to the type of object. For example, the user profile store 636 contains data structures with fields suitable for describing a user's account and information related to a user's account. When a new object of a particular type is created, the social networking system 630 initializes a new data structure of the corresponding type, assigns a unique object identifier to it, and begins to add data to the object as needed. This might occur, for example, when a user becomes a user of the social networking system 630, the social networking system 630 generates a new instance of a user profile in the user profile store 636, assigns a unique identifier to the user account, and begins to populate the fields of the user account with information provided by the user.

The connection store 638 includes data structures suitable for describing a user's connections to other users, connections to external systems 620 or connections to other entities. The connection store 638 may also associate a connection type with a user's connections, which may be used in conjunction with the user's privacy setting to regulate access to information about the user. In an embodiment of the invention, the user profile store 636 and the connection store 638 may be implemented as a federated database.

Data stored in the connection store 638, the user profile store 636, and the activity log 642 enables the social networking system 630 to generate the social graph that uses nodes to identify various objects and edges connecting nodes to identify relationships between different objects. For example, if a first user establishes a connection with a second user in the social networking system 630, user accounts of the first user and the second user from the user profile store 636 may act as nodes in the social graph. The connection between the first user and the second user stored by the connection store 638 is an edge between the nodes associated with the first user and the second user. Continuing this example, the second user may then send the first user a message within the social networking system 630. The action of sending the message, which may be stored, is another edge between the two nodes in the social graph representing the first user and the second user. Additionally, the message itself may be identified and included in the social graph as another node connected to the nodes representing the first user and the second user.

In another example, a first user may tag a second user in an image that is maintained by the social networking system 630 (or, alternatively, in an image maintained by another system outside of the social networking system 630). The image may itself be represented as a node in the social networking system 630. This tagging action may create edges between the first user and the second user as well as create an edge between each of the users and the image, which is also a node in the social graph. In yet another example, if a user confirms attending an event, the user and the event are nodes obtained from the user profile store 636, where the attendance of the event is an edge between the nodes that may be retrieved from the activity log 642. By generating and maintaining the social graph, the social networking system 630 includes data describing many different types of objects and the interactions and connections among those objects, providing a rich source of socially relevant information.

The web server 632 links the social networking system 630 to one or more user devices 610 and/or one or more external systems 620 via the network 650. The web server 632 serves web pages, as well as other web-related content, such as Java, JavaScript, Flash, XML, and so forth. The web server 632 may include a mail server or other messaging functionality for receiving and routing messages between the social networking system 630 and one or more user devices 610. The messages can be instant messages, queued messages (e.g., email), text and SMS messages, or any other suitable messaging format.

The API request server 634 allows one or more external systems 620 and user devices 610 to call access information from the social networking system 630 by calling one or more API functions. The API request server 634 may also allow external systems 620 to send information to the social networking system 630 by calling APIs. The external system 620, in one embodiment, sends an API request to the social networking system 630 via the network 650, and the API request server 634 receives the API request. The API request server 634 processes the request by calling an API associated with the API request to generate an appropriate response, which the API request server 634 communicates to the external system 620 via the network 650. For example, responsive to an API request, the API request server 634 collects data associated with a user, such as the user's connections that have logged into the external system 620, and communicates the collected data to the external system 620. In another embodiment, the user device 610 communicates with the social networking system 630 via APIs in the same manner as external systems 620.

The action logger 640 is capable of receiving communications from the web server 632 about user actions on and/or off the social networking system 630. The action logger 640 populates the activity log 642 with information about user actions, enabling the social networking system 630 to discover various actions taken by its users within the social networking system 630 and outside of the social networking system 630. Any action that a particular user takes with respect to another node on the social networking system 630 may be associated with each user's account, through information maintained in the activity log 642 or in a similar database or other data repository. Examples of actions taken by a user within the social networking system 630 that are identified and stored may include, for example, adding a connection to another user, sending a message to another user, reading a message from another user, viewing content associated with another user, attending an event posted by another user, posting an image, attempting to post an image, or other actions interacting with another user or another object. When a user takes an action within the social networking system 630, the action is recorded in the activity log 642. In one embodiment, the social networking system 630 maintains the activity log 642 as a database of entries. When an action is taken within the social networking system 630, an entry for the action is added to the activity log 642. The activity log 642 may be referred to as an action log.

Additionally, user actions may be associated with concepts and actions that occur within an entity outside of the social networking system 630, such as an external system 620 that is separate from the social networking system 630. For example, the action logger 640 may receive data describing a user's interaction with an external system 620 from the web server 632. In this example, the external system 620 reports a user's interaction according to structured actions and objects in the social graph.

Other examples of actions where a user interacts with an external system 620 include a user expressing an interest in an external system 620 or another entity, a user posting a comment to the social networking system 630 that discusses an external system 620 or a web page 622*a* within the external system 620, a user posting to the social networking system 630 a Uniform Resource Locator (URL) or other identifier associated with an external system 620, a user attending an event associated with an external system 620, or any other action by a user that is related to an external system 620. Thus, the activity log 642 may include actions describing interactions between a user of the social networking system 630 and an external system 620 that is separate from the social networking system 630.

The authorization server 644 enforces one or more privacy settings of the users of the social networking system 630. A privacy setting of a user determines how particular information associated with a user can be shared. The privacy setting comprises the specification of particular information associated with a user and the specification of the entity or entities with whom the information can be shared. Examples of entities with which information can be shared may include other users, applications, external systems 620, or any entity that can potentially access the information. The information that can be shared by a user comprises user account information, such as profile photos, phone numbers associated with the user, user's connections, actions taken by the user such as adding a connection, changing user profile information, and the like.

The privacy setting specification may be provided at different levels of granularity. For example, the privacy setting may identify specific information to be shared with other users; the privacy setting identifies a work phone number or a specific set of related information, such as, personal information including profile photo, home phone number, and status. Alternatively, the privacy setting may apply to all the information associated with the user. The specification of the set of entities that can access particular information can also be specified at various levels of granularity. Various sets of entities with which information can be shared may include, for example, all friends of the user, all friends of friends, all applications, or all external systems

620. One embodiment allows the specification of the set of entities to comprise an enumeration of entities. For example, the user may provide a list of external systems 620 that are allowed to access certain information. Another embodiment allows the specification to comprise a set of entities along with exceptions that are not allowed to access the information. For example, a user may allow all external systems 620 to access the user's work information, but specify a list of external systems 620 that are not allowed to access the work information. Certain embodiments call the list of exceptions that are not allowed to access certain information a "block list". External systems 620 belonging to a block list specified by a user are blocked from accessing the information specified in the privacy setting. Various combinations of granularity of specification of information, and granularity of specification of entities, with which information is shared are possible. For example, all personal information may be shared with friends whereas all work information may be shared with friends of friends.

The authorization server 644 contains logic to determine if certain information associated with a user can be accessed by a user's friends, external systems 620, and/or other applications and entities. The external system 620 may need authorization from the authorization server 644 to access the user's more private and sensitive information, such as the user's work phone number. Based on the user's privacy settings, the authorization server 644 determines if another user, the external system 620, an application, or another entity is allowed to access information associated with the user, including information about actions taken by the user.

In some embodiments, the social networking system 630 can include a nested content module 646. The nested content module 646 can be implemented with the nested content module 102, as discussed in more detail herein. In some embodiments, one or more functionalities of the nested content module 646 can be implemented in the user device 610.

Hardware Implementation

Figure 7:
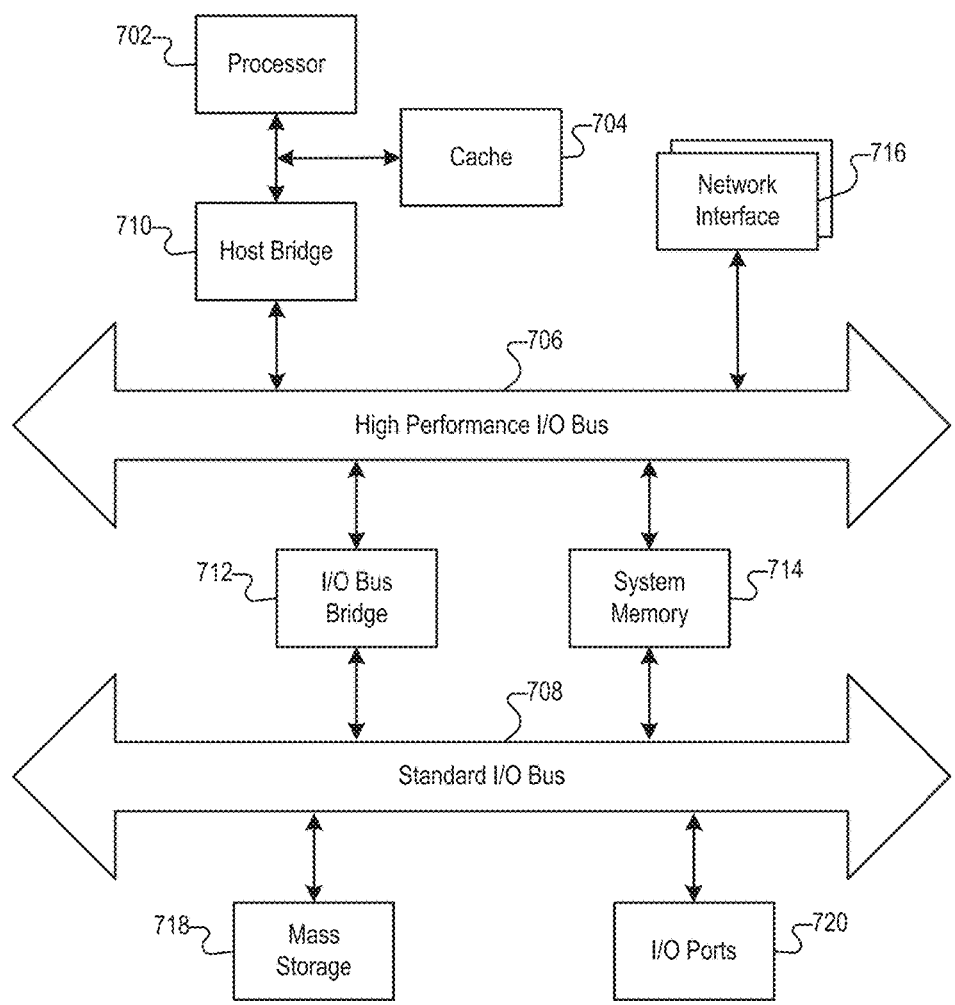
FIG. 7 illustrates an example of a computer system that can be utilized in various scenarios, according to an embodiment of the present disclosure.

The foregoing processes and features can be implemented by a wide variety of machine and computer system architectures and in a wide variety of network and computing environments. FIG. 7 illustrates an example of a computer system 700 that may be used to implement one or more of the embodiments described herein in accordance with an embodiment of the invention. The computer system 700 includes sets of instructions for causing the computer system 700 to perform the processes and features discussed herein. The computer system 700 may be connected (e.g., networked) to other machines. In a networked deployment, the computer system 700 may operate in the capacity of a server machine or a client machine in a client-server network environment, or as a peer machine in a peer-to-peer (or distributed) network environment. In an embodiment of the invention, the computer system 700 may be the social networking system 630, the user device 610, and the external system 720, or a component thereof. In an embodiment of the invention, the computer system 700 may be one server among many that constitutes all or part of the social networking system 630.

The computer system 700 includes a processor 702, a cache 704, and one or more executable modules and drivers, stored on a computer-readable medium, directed to the processes and features described herein. Additionally, the computer system 700 includes a high performance input/output (I/O) bus 706 and a standard I/O bus 708. A host bridge 710 couples processor 702 to high performance I/O bus 706, whereas I/O bus bridge 712 couples the two buses 706 and 708 to each other. A system memory 714 and one or more network interfaces 716 couple to high performance I/O bus 706. The computer system 700 may further include video memory and a display device coupled to the video memory (not shown). Mass storage 718 and I/O ports 720 couple to the standard I/O bus 708. The computer system 700 may optionally include a keyboard and pointing device, a display device, or other input/output devices (not shown) coupled to the standard I/O bus 708. Collectively, these elements are intended to represent a broad category of computer hardware systems, including but not limited to computer systems based on the x86-compatible processors manufactured by Intel Corporation of Santa Clara, Calif., and the x86-compatible processors manufactured by Advanced Micro Devices (AMD), Inc., of Sunnyvale, Calif., as well as any other suitable processor.

An operating system manages and controls the operation of the computer system 700, including the input and output of data to and from software applications (not shown). The operating system provides an interface between the software applications being executed on the system and the hardware components of the system. Any suitable operating system may be used, such as the LINUX Operating System, the Apple Macintosh Operating System, available from Apple Computer Inc. of Cupertino, Calif., UNIX operating systems, Microsoft® Windows® operating systems, BSD operating systems, and the like. Other implementations are possible.

The elements of the computer system 700 are described in greater detail below. In particular, the network interface 716 provides communication between the computer system 700 and any of a wide range of networks, such as an Ethernet (e.g., IEEE 802.3) network, a backplane, etc. The mass storage 718 provides permanent storage for the data and programming instructions to perform the above-described processes and features implemented by the respective computing systems identified above, whereas the system memory 714 (e.g., DRAM) provides temporary storage for the data and programming instructions when executed by the processor 702. The I/O ports 720 may be one or more serial and/or parallel communication ports that provide communication between additional peripheral devices, which may be coupled to the computer system 700.

The computer system 700 may include a variety of system architectures, and various components of the computer system 700 may be rearranged. For example, the cache 704 may be on-chip with processor 702. Alternatively, the cache 704 and the processor 702 may be packed together as a "processor module", with processor 702 being referred to as the "processor core". Furthermore, certain embodiments of the invention may neither require nor include all of the above components. For example, peripheral devices coupled to the standard I/O bus 708 may couple to the high performance I/O bus 706. In addition, in some embodiments, only a single bus may exist, with the components of the computer system 700 being coupled to the single bus. Moreover, the computer system 700 may include additional components, such as additional processors, storage devices, or memories.

In general, the processes and features described herein may be implemented as part of an operating system or a specific application, component, program, object, module, or series of instructions referred to as "programs". For example, one or more programs may be used to execute specific processes described herein. The programs typically comprise one or more instructions in various memory and storage devices in the computer system 700 that, when read and executed by one or more processors, cause the computer system 700 to perform operations to execute the processes and features described herein. The processes and features described herein may be implemented in software, firmware, hardware (e.g., an application specific integrated circuit), or any combination thereof.

In one implementation, the processes and features described herein are implemented as a series of executable modules run by the computer system 700, individually or collectively in a distributed computing environment. The foregoing modules may be realized by hardware, executable modules stored on a computer-readable medium (or machine-readable medium), or a combination of both. For example, the modules may comprise a plurality or series of instructions to be executed by a processor in a hardware system, such as the processor 702. Initially, the series of instructions may be stored on a storage device, such as the mass storage 718. However, the series of instructions can be stored on any suitable computer readable storage medium. Furthermore, the series of instructions need not be stored locally, and could be received from a remote storage device, such as a server on a network, via the network interface 716. The instructions are copied from the storage device, such as the mass storage 718, into the system memory 714 and then accessed and executed by the processor 702. In various implementations, a module or modules can be executed by a processor or multiple processors in one or multiple locations, such as multiple servers in a parallel processing environment.

Examples of computer-readable media include, but are not limited to, recordable type media such as volatile and non-volatile memory devices; solid state memories; floppy and other removable disks; hard disk drives; magnetic media; optical disks (e.g., Compact Disk Read-Only Memory (CD ROMS), Digital Versatile Disks (DVDs)); other similar non-transitory (or transitory), tangible (or non-tangible) storage medium; or any type of medium suitable for storing, encoding, or carrying a series of instructions for execution by the computer system 700 to perform any one or more of the processes and features described herein.

For purposes of explanation, numerous specific details are set forth in order to provide a thorough understanding of the description. It will be apparent, however, to one skilled in the art that embodiments of the disclosure can be practiced without these specific details. In some instances, modules, structures, processes, features, and devices are shown in block diagram form in order to avoid obscuring the description. In other instances, functional block diagrams and flow diagrams are shown to represent data and logic flows. The components of block diagrams and flow diagrams (e.g., modules, blocks, structures, devices, features, etc.) may be variously combined, separated, removed, reordered, and replaced in a manner other than as expressly described and depicted herein.

Reference in this specification to "one embodiment", "an embodiment", "other embodiments", "one series of embodiments", "some embodiments", "various embodiments", or the like means that a particular feature, design, structure, or characteristic described in connection with the embodiment is included in at least one embodiment of the disclosure. The appearances of, for example, the phrase "in one embodiment" or "in an embodiment" in various places in the specification are not necessarily all referring to the same embodiment, nor are separate or alternative embodiments mutually exclusive of other embodiments. Moreover, whether or not there is express reference to an "embodiment" or the like, various features are described, which may be variously combined and included in some embodiments, but also variously omitted in other embodiments. Similarly, various features are described that may be preferences or requirements for some embodiments, but not other embodiments.

The language used herein has been principally selected for readability and instructional purposes, and it may not have been selected to delineate or circumscribe the inventive subject matter. It is therefore intended that the scope of the invention be limited not by this detailed description, but rather by any claims that issue on an application based hereon. Accordingly, the disclosure of the embodiments of the invention is intended to be illustrative, but not limiting, of the scope of the invention, which is set forth in the following claims.

What is claimed is:

1. A computer-implemented method comprising:
providing, by a computing system, a virtual content item representing a virtual three-dimensional space, wherein the virtual content item is provided via a user interface presenting a three-dimensional environment, wherein a portion of the virtual content item is accessible to a user through a viewport, wherein the portion is determined based on a location and direction of the viewport in the virtual three-dimensional space;
identifying, by the computing system, an object included within the virtual content item;
determining, by the computing system, one or more content items to provide within the virtual content item in association with the object based on attributes associated with the one or more content items, wherein the attributes include at least one of content, subject matter, keywords, or targeting criteria;
determining, by the computing system, a three-dimensional position of the one or more content items within the virtual three-dimensional space of the virtual content item;
determining, by the computing system, that the user interacted with the object during a presentation of the virtual content item;
pausing, by the computing system, the presentation of the virtual content item in the user interface;
providing, by the computing system, a presentation of the one or more content items in the user interface; and
resuming, by the computing system, the presentation of the virtual content item after the presentation of the one or more content items stops or completes.

2. The computer-implemented method of claim 1, wherein the three-dimensional position of the one or more content items is determined in relation to a three-dimensional position of a point of view within the virtual content item.

3. The computer-implemented method of claim 1, wherein the virtual content item is one or more of: a spherical video, a 360 photo, a virtual reality (VR) content item, or an augmented reality (AR) content item.

4. The computer-implemented method of claim 1, wherein the one or more content items are presented as one or more of: a two-dimensional content item, a three-dimensional content item, or a virtual content item.

5. The computer-implemented method of claim 1, wherein the object is one or more of: a logo or a brand, and wherein the one or more content items include one or more of: an advertisement, information relating to a product, or a representation of a product.

6. The computer-implemented method of claim 1, wherein the object is detected based on one or more of: object detection or object tracking.

7. The computer-implemented method of claim 1, wherein the object is predefined within the virtual content item based on user input.

8. The computer-implemented method of claim 1, wherein the virtual content item is presented in the user interface and the one or more content items include a second virtual content item, and wherein the second virtual content item is presented in the user interface in response to selection of the object or an indicator associated with the object.

9. The computer-implemented method of claim 1, wherein the object is a polyhedron and the one or more content items is mapped to at least one surface of the polyhedron.

10. The computer-implemented method of claim 9, further comprising providing a preview of the content item on the at least one surface.

11. A system comprising:
at least one hardware processor; and
a memory storing instructions that, when executed by the at least one hardware processor, cause the system to perform:
providing a virtual content item representing a virtual three-dimensional space, wherein the virtual content item is provided via a user interface presenting a three-dimensional environment, wherein a portion of the virtual content item is accessible to a user through a viewport, wherein the portion is determined based on a location and direction of the viewport in the virtual three-dimensional space;
identifying an object included within the virtual content item;
determining one or more content items to provide within the virtual content item in association with the object based on attributes associated with the one or more content items, wherein the attributes include at least one of content, subject matter, keywords, or targeting criteria;
determining a three-dimensional position of the one or more content items within the virtual three-dimensional space of the virtual content item;
determining that the user interacted with the object during a presentation of the virtual content item;
pausing the presentation of the virtual content item in the user interface;
providing a presentation of the one or more content items in the user interface; and
resuming the presentation of the virtual content item after the presentation of the one or more content items stops or completes.

12. The system of claim 11, wherein the three-dimensional position of the one or more content items is determined in relation to a three-dimensional position of a point of view within the virtual content item.

13. The system of claim 11, wherein the virtual content item is one or more of: a spherical video, a virtual reality (VR) content item, or an augmented reality (AR) content item.

14. A non-transitory computer readable medium including instructions that, when executed by at least one hardware processor of a computing system, cause the computing system to perform a method comprising:
providing a virtual content item representing a virtual three-dimensional space, wherein the virtual content item is provided via a user interface presenting a three-dimensional environment, wherein a portion of the virtual content item is accessible to a user through a viewport, wherein the portion is determined based on a location and direction of the viewport in the virtual three-dimensional space;
identifying an object included within the virtual content item;
determining one or more content items to provide within the virtual content item in association with the object based on attributes associated with the one or more content items;
determining a three-dimensional position of the one or more content items within the virtual three-dimensional space of the virtual content item;
determining that the user interacted with the object during a presentation of the virtual content item;
pausing the presentation of the virtual content item in the user interface;
providing a presentation of the one or more content items in the user interface; and
resuming the presentation of the virtual content item after the presentation of the one or more content items stops or completes.

15. The non-transitory computer readable medium of claim 14, wherein the method further comprises providing the one or more content items at the determined three-dimensional position.

16. The non-transitory computer readable medium of claim 14, wherein the three-dimensional position includes a horizontal coordinate, a vertical coordinate, and a depth coordinate.

17. The non-transitory computer readable medium of claim 14, wherein the three-dimensional position of the one or more content items is determined in relation to a three-dimensional position of a point of view within the virtual content item.

18. The non-transitory computer readable medium of claim 14, wherein the virtual content item is one or more of: a spherical video, a virtual reality (VR) content item, or an augmented reality (AR) content item.

19. The non-transitory computer readable medium of claim 14, wherein the object is a polyhedron and the one or more content items is mapped to at least one surface of the polyhedron.

20. The non-transitory computer readable medium of claim 19, wherein the method further comprises providing a preview of the content item on the at least one surface.

* * * * *